United States Patent
Watson et al.

(10) Patent No.: US 11,373,683 B2
(45) Date of Patent: Jun. 28, 2022

(54) DATA STORAGE DEVICE USING LATERALLY OFFSET READ ELEMENT TO COMPENSATE FOR TAPE STRETCH

(71) Applicant: Western Digital Technologies, Inc., San Jose, CA (US)

(72) Inventors: Mark L. Watson, Boulder, CO (US); Diane L. Brown, San Jose, CA (US); David J. Seagle, Morgan Hill, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/179,511

(22) Filed: Feb. 19, 2021

(65) Prior Publication Data
US 2022/0108725 A1  Apr. 7, 2022

Related U.S. Application Data

(60) Provisional application No. 63/086,160, filed on Oct. 1, 2020.

(51) Int. Cl.
| | |
|---|---|
| *G11B 5/584* | (2006.01) |
| *G11B 21/00* | (2006.01) |
| *G11B 20/18* | (2006.01) |
| *G11B 15/093* | (2006.01) |
| *G11B 5/008* | (2006.01) |
| *G11B 5/588* | (2006.01) |

(52) U.S. Cl.
CPC ........ *G11B 21/006* (2013.01); *G11B 5/00813* (2013.01); *G11B 15/093* (2013.01); *G11B 20/1879* (2013.01); *G11B 5/584* (2013.01); *G11B 5/588* (2013.01)

(58) Field of Classification Search
None
See application file for complete search history.

(56) References Cited

U.S. PATENT DOCUMENTS

| | | |
|---|---|---|
| 6,222,698 B1 | 4/2001 | Barndt et al. |
| 6,918,553 B2 | 7/2005 | Zwettler et al. |
| 7,054,093 B1 | 5/2006 | Anderson et al. |

(Continued)

FOREIGN PATENT DOCUMENTS

| | | |
|---|---|---|
| JP | 2005327392 A | 11/2005 |
| JP | 6610824 B1 | 11/2019 |

OTHER PUBLICATIONS

International Search Report and the Written Opinion for International Application No. PCT/US2021/038155 dated Oct. 8, 2021, 10 pages.

*Primary Examiner* — Tan X Dinh
(74) *Attorney, Agent, or Firm* — Patterson + Sheridan, LLP; Steven H. VerSteeg (57) ABSTRACT

A data storage device configured to access a magnetic tape is disclosed, wherein the data storage device comprises at least one head configured to access the magnetic tape, wherein the head comprises a write element, a first read element substantially aligned with the write element, and a second read element laterally offset from the first read element. Data is written to a data track and read-after-write verify is performed using the write element and the first read element. In response to a read command received from a host, the data track is read using the second read element to compensate for a stretching of the magnetic tape.

26 Claims, 8 Drawing Sheets

(56) References Cited

U.S. PATENT DOCUMENTS

| | | | |
|---|---|---|---|
| 7,193,812 B2 | 3/2007 | Eaton | |
| 7,342,738 B1 * | 3/2008 | Anderson | G11B 5/584 |
| | | | 360/77.12 |
| 7,480,117 B2 | 1/2009 | Biskeborn et al. | |
| 7,548,395 B2 | 6/2009 | Biskeborn et al. | |
| 7,724,459 B2 | 5/2010 | Czarnecki et al. | |
| 8,711,501 B2 | 4/2014 | Childers et al. | |
| 8,780,486 B2 | 7/2014 | Bui et al. | |
| 8,891,197 B2 | 11/2014 | Hancock et al. | |
| 8,982,495 B2 | 3/2015 | Biskeborn et al. | |
| 9,177,580 B1 * | 11/2015 | Vanderheyden | G11B 5/4893 |
| 9,208,809 B2 | 12/2015 | Biskeborn et al. | |
| 9,449,628 B2 | 9/2016 | Biskeborn et al. | |
| 9,892,751 B1 | 2/2018 | Harper | |
| 10,891,972 B2 * | 1/2021 | Biskeborn | G11B 5/584 |
| 2003/0227702 A1 * | 12/2003 | Watson | G11B 5/4969 |
| | | | 360/53 |
| 2005/0018349 A1 * | 1/2005 | Eaton | G11B 5/584 |
| | | | 360/129 |
| 2005/0036227 A1 | 2/2005 | Hoerger | |
| 2010/0079905 A1 * | 4/2010 | Fasen | G11B 5/584 |
| | | | 360/77.12 |
| 2012/0206832 A1 | 8/2012 | Hamidi et al. | |
| 2013/0321949 A1 * | 12/2013 | Cherubini | G11B 5/29 |
| | | | 360/77.13 |
| 2020/0321032 A1 * | 10/2020 | Nakashio | G11B 23/0316 |

* cited by examiner

DATA STORAGE DEVICE USING LATERALLY OFFSET READ ELEMENT TO COMPENSATE FOR TAPE STRETCH

CROSS REFERENCE TO RELATED APPLICATIONS

This application claims priority to U.S. Provisional Patent Application Ser. No. 63/086,160, filed on Oct. 1, 2020, which is hereby incorporated by reference in its entirety.

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

DETAILED DESCRIPTION

Figure 1A:
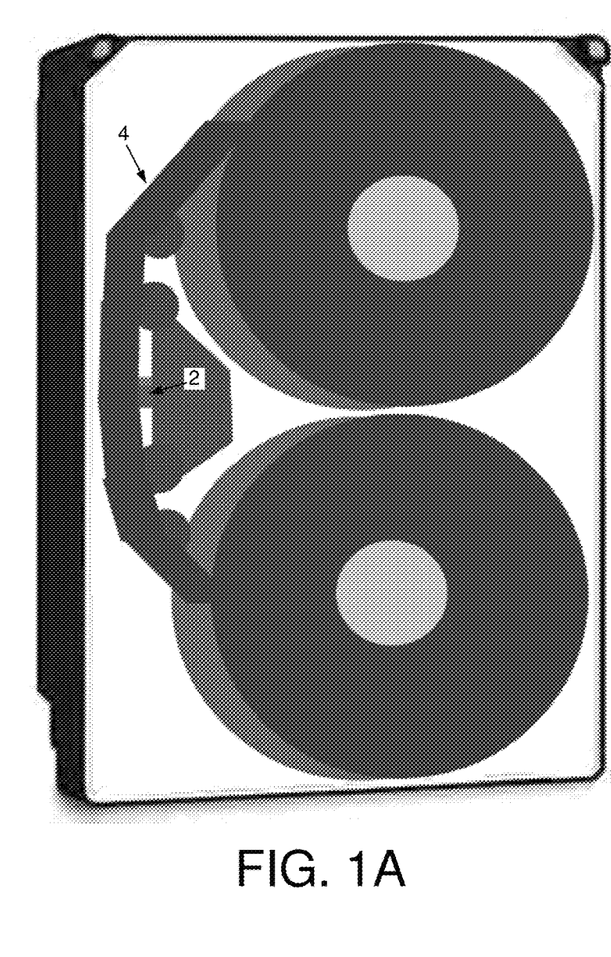
FIG. 1A shows a data storage device according to an embodiment comprising at least one head configured to access a magnetic tape.
Figure 1B:
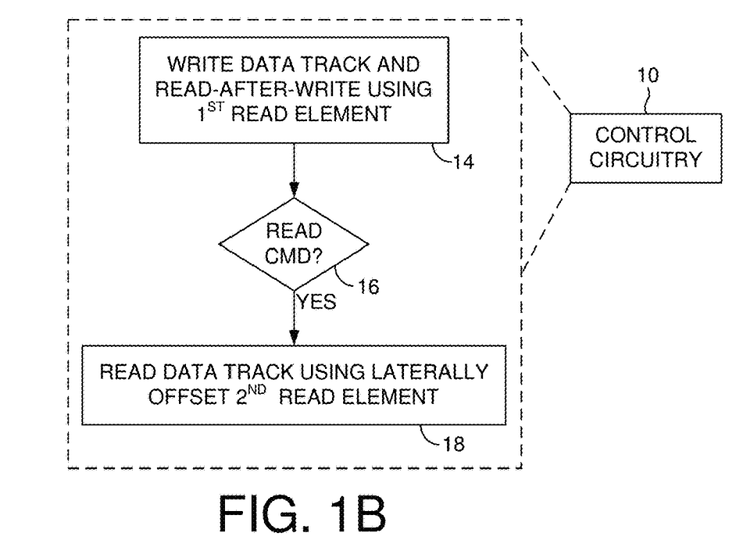
FIG. 1B is a flow diagram according to an embodiment wherein a first read element is used to perform a read-after-write verify of a data track and a second, laterally offset read element is used to perform a read of the data track to compensate for tape stretch.
Figure 1C:
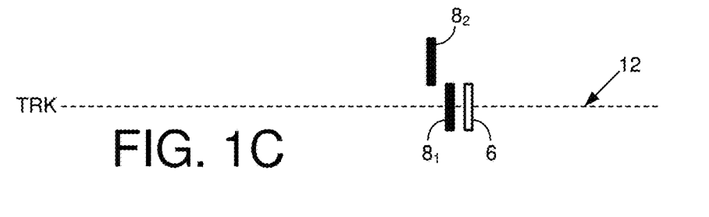
FIG. 1C shows a first read element substantially aligned with a write element for preforming a read-after-write verify of a data track.
Figure 1D:
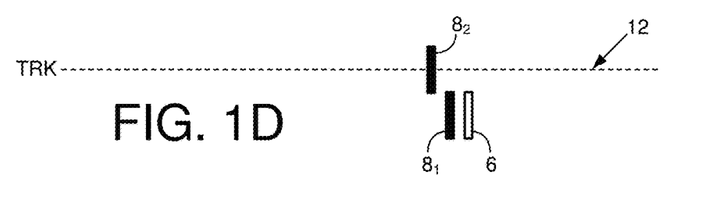
FIG. 1D shows a second, laterally offset read element used to read the data track in response to a host command.

FIGS. 1A-1D show a data storage device according to an embodiment comprising at least one head 2 configured to access a magnetic tape 4, wherein the head comprises a write element 6, a first read element 81 substantially aligned with the write element 6, and a second read element 82 laterally offset from the first read element 81. The data storage device further comprises control circuitry 10 configured to execute the flow diagram of FIG. 1B, wherein a data track 12 is written (FIG. 1C) and a read-after-write verify is performed using the write element and the first read element (block 14). In response to a read command received from a host (block 16), the data track is read using the second read element to compensate for a stretching of the magnetic tape (block 1D) as shown in FIG. 1D.

Figure 1E:
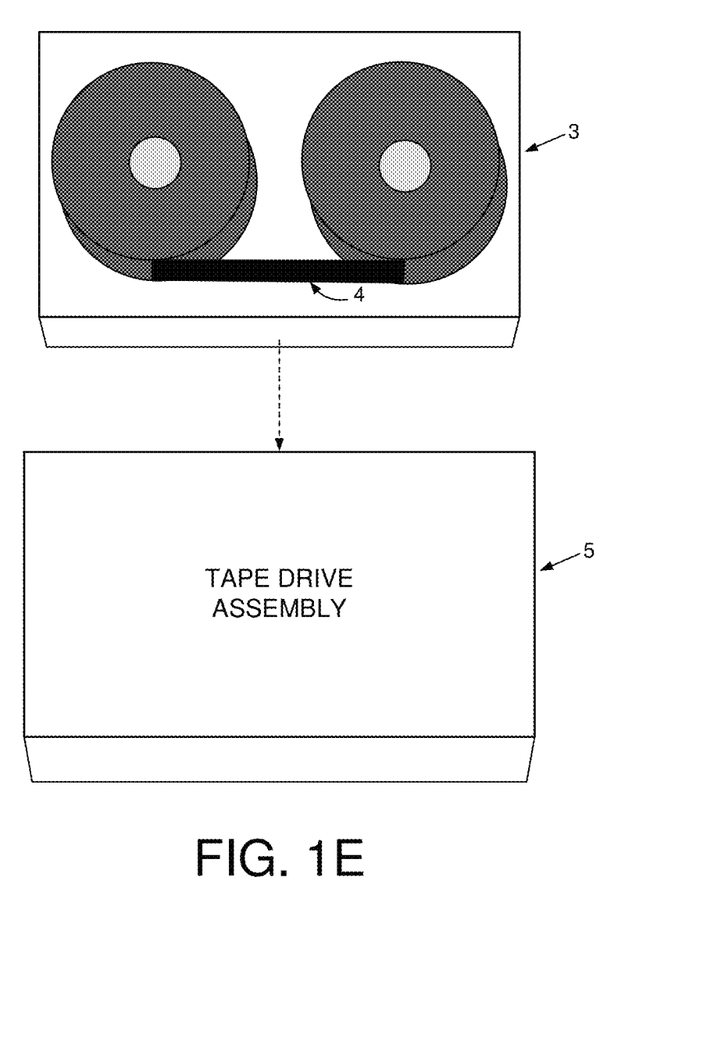
FIG. 1E shows a data storage device comprising a cartridge assembly comprising a magnetic tape, and a tape drive assembly configured to access the magnetic tape.

In the embodiment of FIG. 1A, the data storage device comprises an embedded magnetic tape 4 installed into a tape drive assembly which, in one embodiment, may be the same form factor as a conventional disk drive. In another embodiment shown in FIG. 1E, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry 6 configured to execute the flow diagram of FIG. 1B.

Figure 2A:
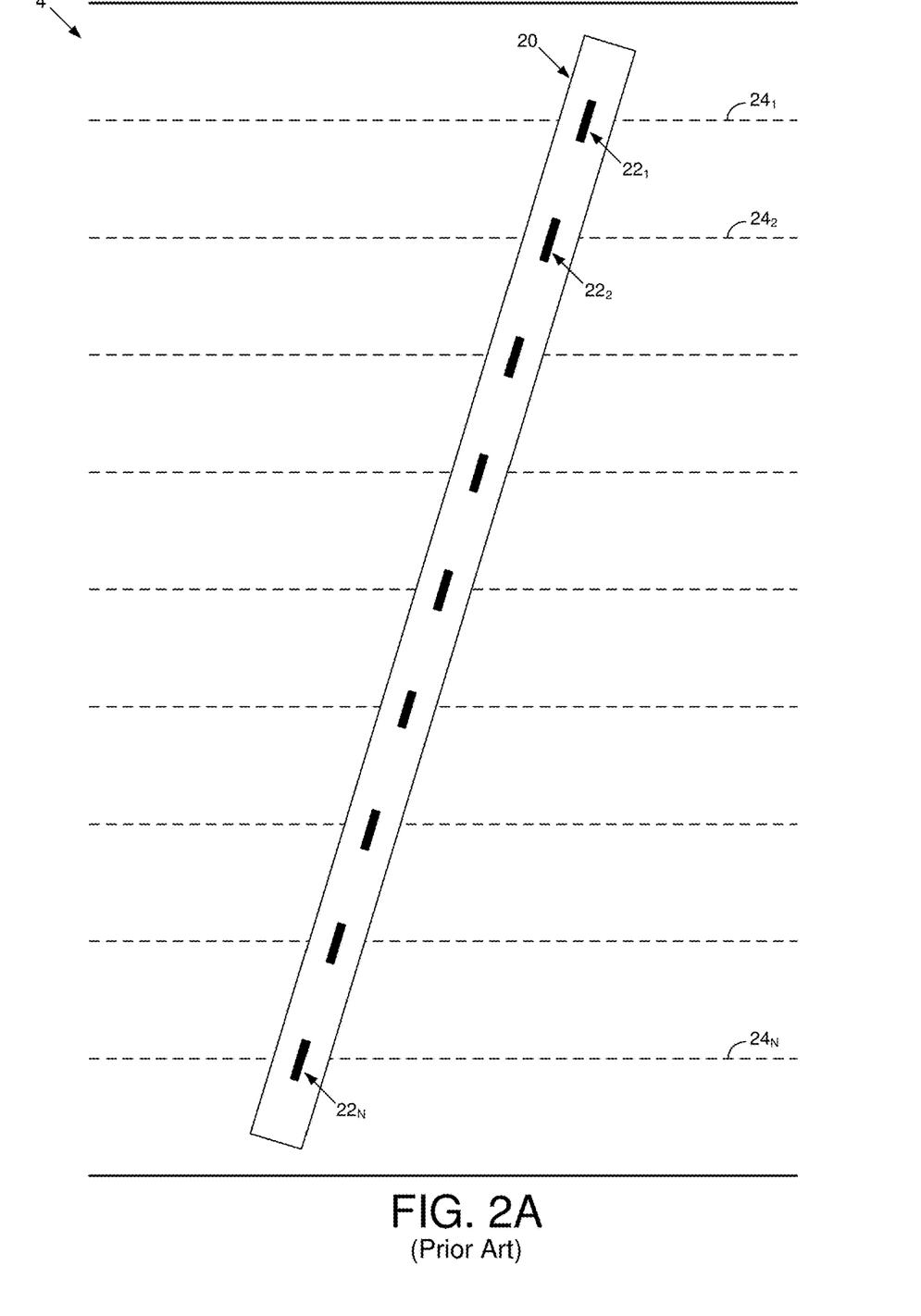
FIG. 2A shows a prior art head bar comprising a plurality of read elements for reading a plurality of data tracks, wherein the head bar is tilted to compensate for tape stretch.
Figure 2B:
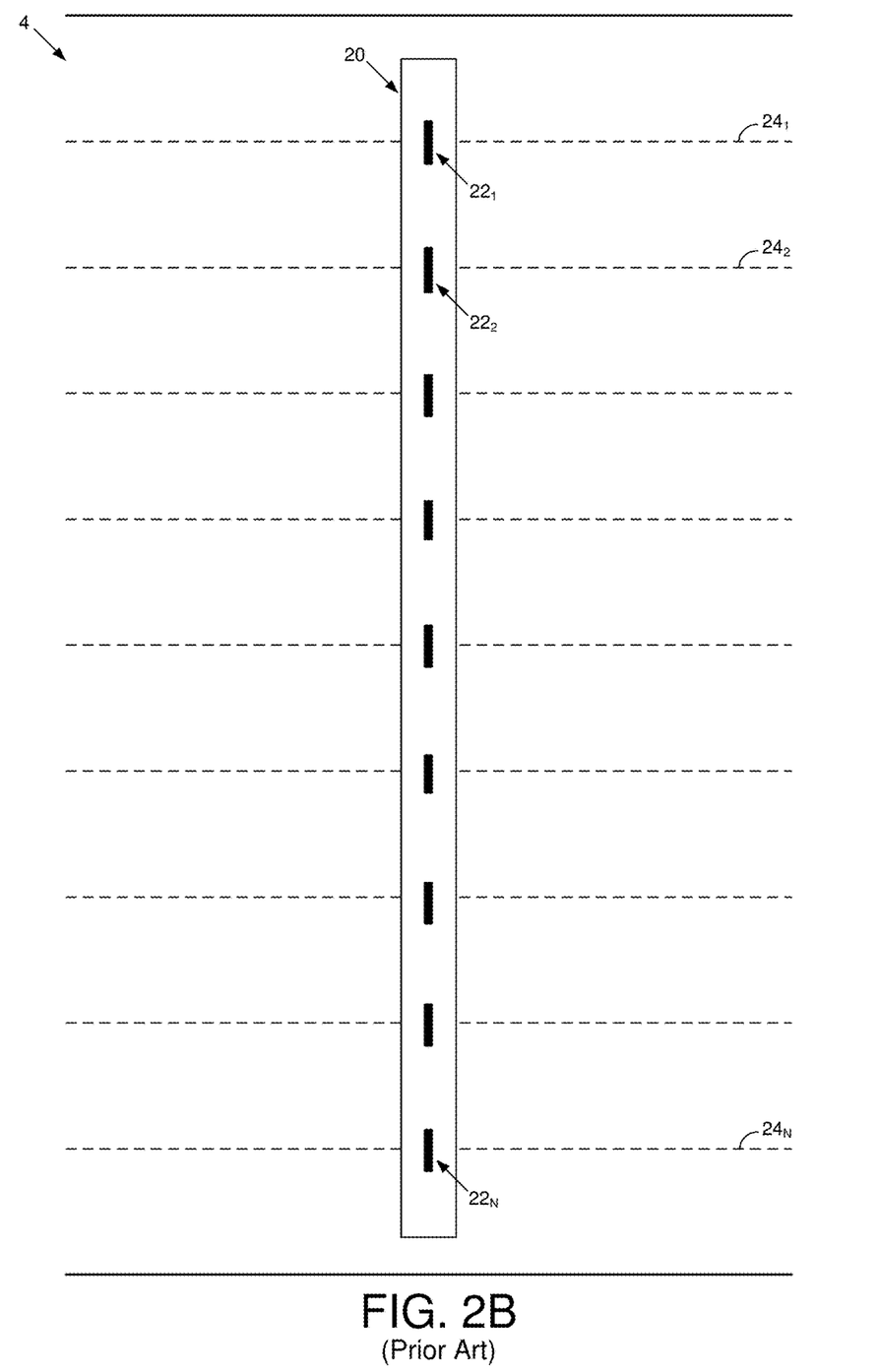
FIG. 2B shows the prior head bar tilted to compensate for an expansion of the magnetic tape.
Figure 2C:
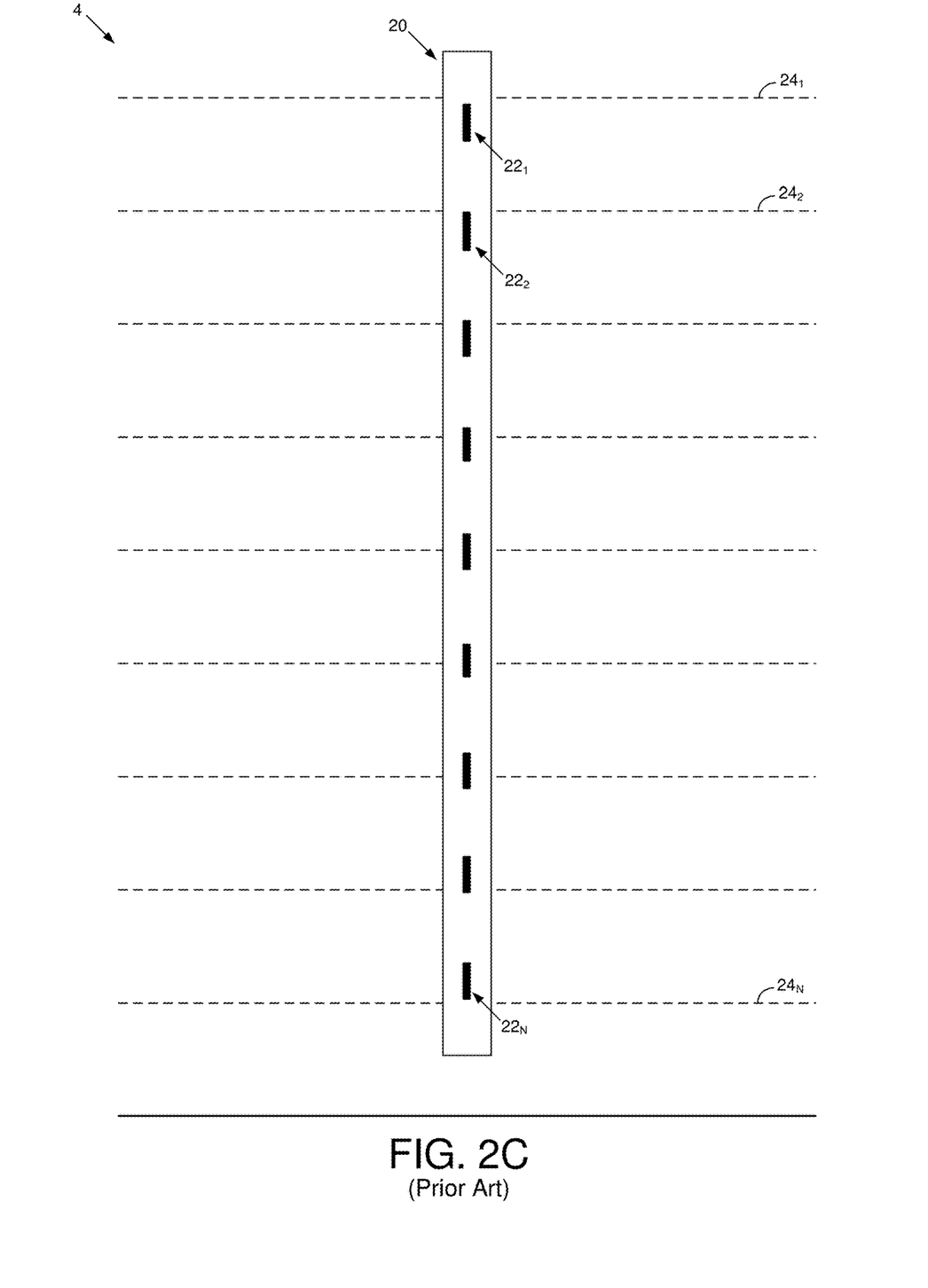
FIG. 2C shows an example where the expansion of the magnetic tape exceeds the compensation ability of tilting the prior art head bar.

FIG. 2A shows a prior art head bar 20 comprising a plurality of read elements $22_1$-$22_N$ that are configured to access a plurality of data tracks $24_1$-$24_N$ recorded on the magnetic tape 4. The head bar 20 is tilted using a suitable actuator in order to compensate for tape stretch which induces a corresponding expansion/contraction of the track pitch due, for example, to changes in tension, ambient temperature, or humidity of the magnetic tape 4. FIG. 2B shows an example of the magnetic tape expanding causing the track pitch of the data tracks to increase such that the head bar 20 is tilted to a maximum vertical position in order to compensate for the tape expansion so that the read elements $22_1$-$22_N$ remain centered over the data tracks $24_1$-$24_N$. FIG. 2C shows an example of the magnetic tape expanding to the point where the increase in track pitch exceeds the ability of tilted head bar 20 to maintain the read elements $22_1$-$22_N$ over the respective data tracks $24_1$-$24_N$.

Figure 3:
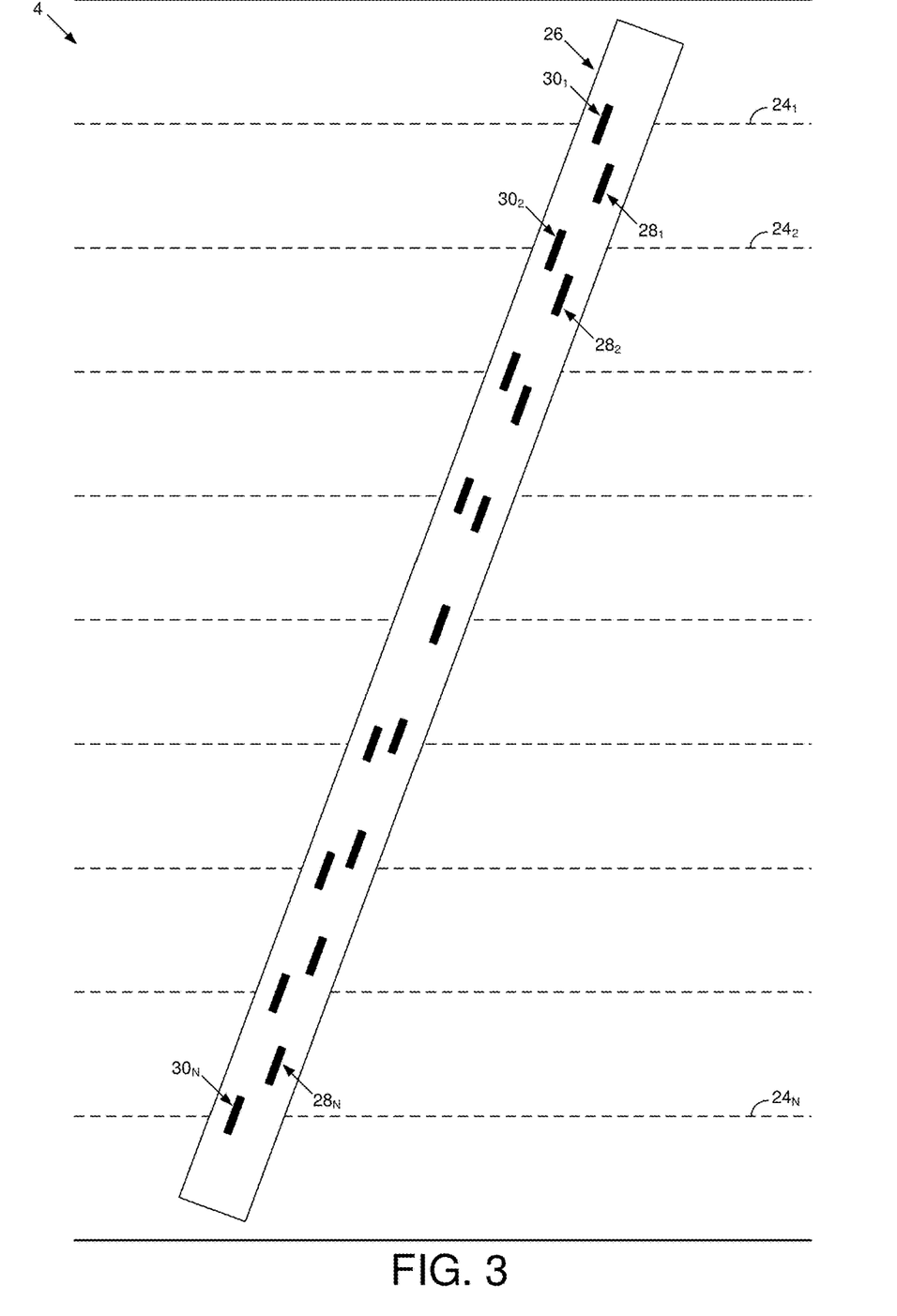
FIGS. 3 and 4 show embodiments of a head bar comprising a first plurality of read elements for performing a read-after-write verify and a second plurality of laterally offset read elements for compensating for tape stretch.

FIG. 3 shows an embodiment of a head bar 26 comprising a first plurality of read elements $28_1$-$28_N$ and a second plurality of read elements $30_1$-$30_N$ which are offset laterally relative to the first plurality of read elements $28_1$-$28_N$. This embodiment expands the range of magnetic tape stretch that may be compensated by tilting the head bar 26. In the example of FIG. 3, the expansion of the magnetic tape 4 exceeds the range of the first plurality of read elements $28_1$-$28_N$ similar to FIG. 2C when the head bar 26 is tilted to its maximum vertical orientation. However, the data tracks $24_1$-$24_N$ are still accessible using the laterally offset second plurality of read elements $30_1$-$30_N$ as shown in FIG. 3. The head bar 26 is shown in FIG. 3 as tilted into a neutral position and is therefore capable of compensating for even further expansion of the magnetic tape 4 by tilting the head bar toward the vertical orientation. In the embodiment of FIG. 3, the lateral offset between the second plurality of read elements $30_1$-$30_N$ and the first plurality of read elements $28_1$-$28_N$ increases toward an outer edge of the magnetic tape 4 in order to compensate for the increase in track pitch when the magnetic tape 4 expands.

In another embodiment, the second plurality of read elements $30_1$-$30_N$ may be laterally offset from the first plurality of read elements $28_1$-$28_N$ toward the middle of the head bar (i.e., opposite the configuration shown in FIG. 3, where the lateral offset is toward the edges of the head bar in the direction of the tape width). In this manner the second plurality of read elements $30_1$-$30_N$ may compensate for the magnetic tape 4 contracting due, for example, to changes in tension, ambient temperature, or humidity of the magnetic tape 4. In one embodiment the head bar may comprise a first set of read elements laterally offset toward the outer edge of the head bar 26 as shown in FIG. 3 together with a second set of read elements laterally offset toward the middle of the head bar 26, thereby further increasing the range of tape stretch that may be compensated.

Figure 4:
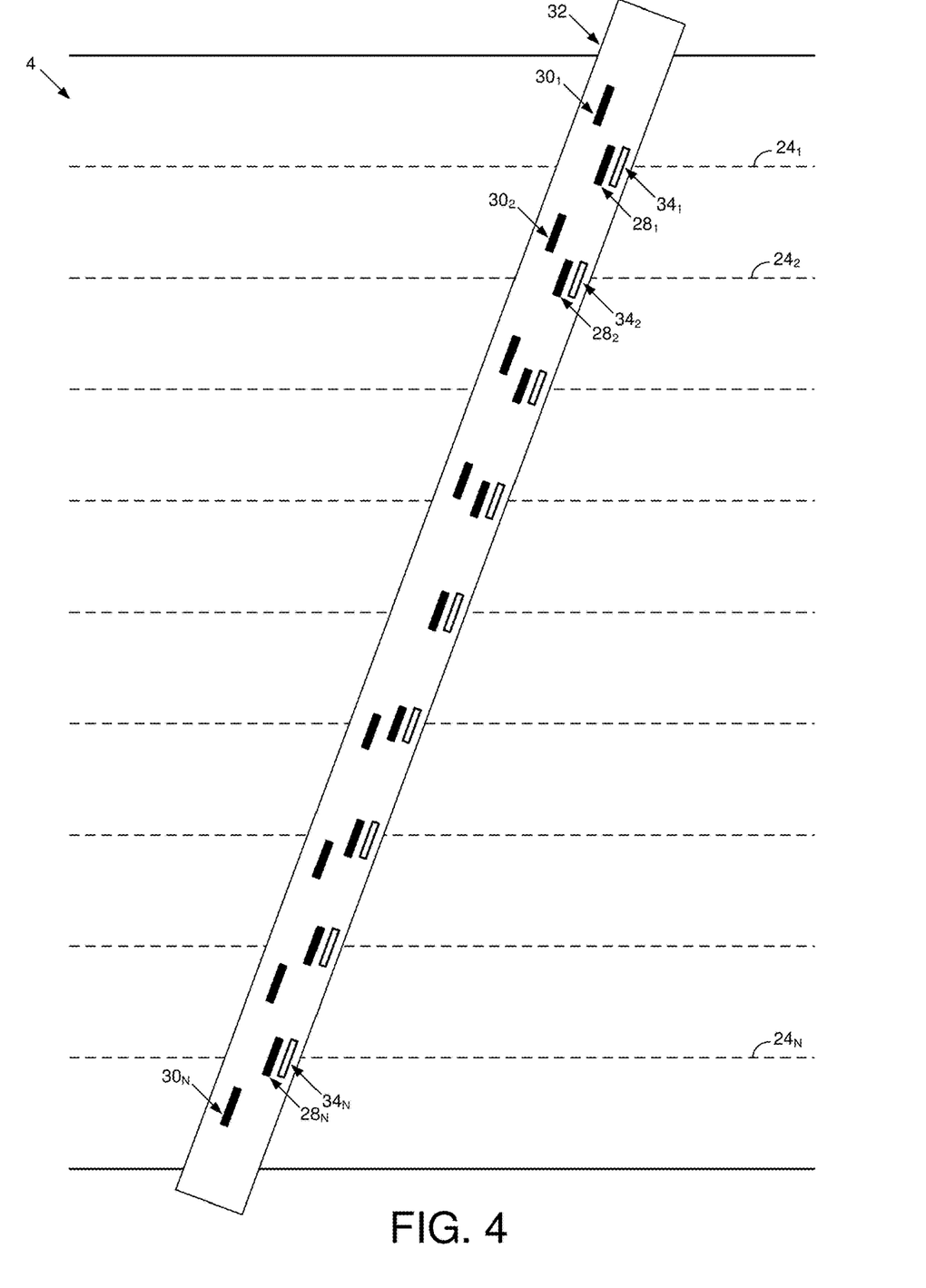

FIG. 4 shows an embodiment of a head bar 32 comprising a first plurality of read elements $28_1$-$28_N$ that are substantially aligned with a plurality of write elements $34_1$-$34_N$ in order to perform a read-after-write verify during a write operation. That is, as the magnetic tape 4 scans from right to left in this embodiment, the data that is written to the data tracks $24_1$-$24_N$ using the write elements $34_1$-$34_N$ is also read using the corresponding read elements $28_1$-$28_N$ in order to verify the recoverability of the written data. In one embodiment, a considerable amount of time may pass between when data is written to the magnetic tape and when the data is read from the magnetic tape by a host. When the read operation is eventually executed, the magnetic tape may have expanded or contracted due, for example, to a change in ambient temperature or humidity between when the write operation was executed and when the read operation is executed. Accordingly in this embodiment, the secondary, laterally offset read elements $30_1$-$30_N$ may be used to read the data tracks in order to compensate for expansion/contraction of the magnetic tape 4.

In one embodiment, the magnetic tape 4 may be tensioned to a first target tension during a write operation, and tensioned to a second, lower target tension during a read operation. For example, in one embodiment the fidelity of the written data may be improved by writing while the magnetic tape 4 is stretched tighter (tensioned higher), whereas the data may be read at a lower tension without significantly degrading the quality of the read signal. In one embodiment, a significant portion of the magnetic tape 4 may be written at a higher target tension, for example, during a backup operation. When the backup operation has completed, the magnetic tape 4 may be rewound at a lower target tension in order to increase the tape longevity by decreasing the tape pack stress during long storage intervals. In one embodiment when the data is later recovered from the magnetic tape 4, the tension may remain at the lower target tension during the read operation so that it is unnecessary to rewind the tape after the read operation (i.e., the tape pack stress will remain at the desired low level so that rewinding the tape is not needed). In one embodiment, reading the magnetic tape 4 at a lower target tension than when written means the magnetic tape 4 will have expanded during the read operation relative to the write operation. Accordingly in one embodiment, the laterally offset secondary read elements $30_1$-$30_N$ may be used to read the data tracks such as shown in FIG. 3 in order to compensate for the expansion of the magnetic tape during the read operations.

Figure 5:
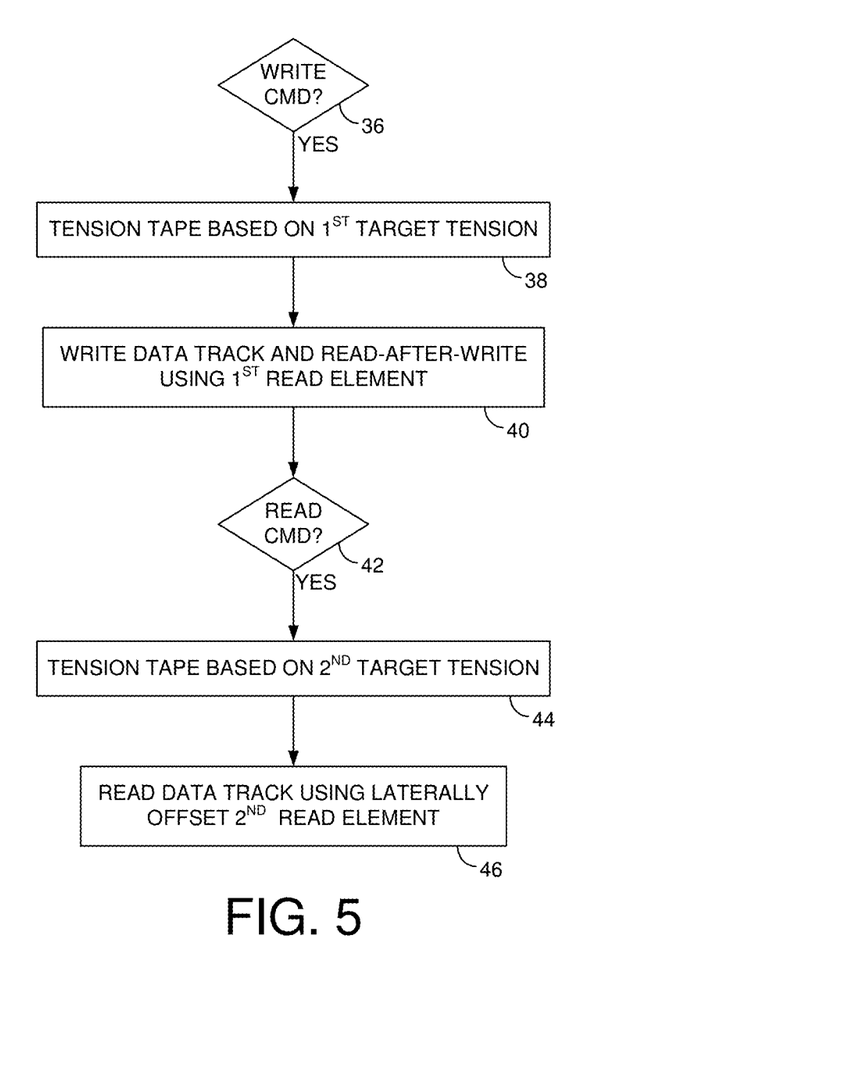
FIG. 5 is a flow diagram according to an embodiment wherein a target tension of the magnetic tape is increased during a write operation and decreased during a read operation.

FIG. 5 shows a flow diagram according to an embodiment wherein when a write command is received (block 36), the magnetic tape is tensioned based on a first target tension (block 38), for example, by controlling at least one reel actuator while winding the magnetic tape. Data is then written to the magnetic tape and optionally a read-after-write verify is performed using a first plurality of read elements that are substantially aligned with corresponding write elements such as shown in FIG. 4 (block 40). When a read command is received to read the written data (block 42), the magnetic tape is tensioned based on a second, lower target tension (block 44) while reading the data track(s) using the laterally offset, secondary read elements (block 46) such as shown in FIG. 3 in order to compensate for the expansion of the magnetic tape due to the lower target tension.

In the embodiment described above with reference to FIG. 3, there is a single, primary read element at the middle of the head bar (i.e., there is no secondary read element) since in this embodiment the middle read element may be positioned over a middle data track in a band of data tracks being accessed regardless as to the degree of tape stretch. When the tape expands such as shown in FIG. 3, the track pitch of the data tracks increases incrementally toward the outer edges of the magnetic tape 4 from the middle data track, thereby necessitating the laterally offset, secondary read elements $30_1$-$30_N$ that compensate for the increasing track pitch. In one embodiment, a secondary read element may be paired with the primary read element at the middle of the head bar in order, for example, to simplify multiplexing between the primary and secondary read elements.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape, the data storage device comprising:
    at least one head configured to access the magnetic tape, wherein the head comprises a write element, a first read element substantially aligned with the write element, and a second read element laterally offset from the first read element, wherein the first read element is disposed between the write element and the second read element; and
    control circuitry configured to:
        write to a data track and perform read-after-write verify using the write element and the first read element; and
        in response to a read command received from a host, read from the data track using the second read element to compensate for a stretching of the magnetic tape.

2. The data storage device as recited in claim 1, wherein the data storage device comprises the magnetic tape.

3. The data storage device as recited in claim 1, wherein:
    the magnetic tape is housed in a cartridge assembly; and
    the data storage device comprises a tape drive assembly configured to receive the cartridge assembly.

4. The data storage device as recited in claim 1, wherein during the write to the data track the magnetic tape has a first width and during the read from the data track the magnetic tape has a second width different than the first width.

5. The data storage device as recited in claim 4, wherein the second width is greater than the first width.

6. The data storage device as recited in claim 5, wherein the second width is greater than the first width due to an expansion of the magnetic tape.

7. The data storage device as recited in claim 5, wherein the second width is greater than the first width due to a tension of the magnetic tape being reduced during the read.

8. The data storage device as recited in claim 1, wherein the head comprises a head bar comprising a first plurality of read elements substantially aligned with a plurality of corresponding write elements, and a second plurality of read elements each laterally offset from a corresponding one of the first plurality of read elements, wherein the first plurality of read elements are disposed between the plurality of corresponding write elements and the second plurality of read elements.

9. The data storage device as recited in claim 8, wherein the lateral offset between the second plurality of read elements and the first plurality of read elements increases toward an outer edge of the magnetic tape.

10. The data storage device as recited in claim 8, wherein the head bar comprises a write element having a substantially aligned first read element without a corresponding laterally offset second read element.

11. A data storage device configured to access a magnetic tape, the data storage device comprising:
    at least one head configured to access the magnetic tape, wherein the head comprises a write element, a first read element laterally offset from the write element, and a second read element substantially aligned with the write element, the second read element being disposed between the write element and the first read element; and
    control circuitry configured to:
        tension the magnetic tape based on a first target tension and write data to a data track; and
        in response to a read command received from a host, tension the magnetic tape based on a second target tension different from the first target tension and read from the data track using the first read element.

12. The data storage device as recited in claim 11, wherein the data storage device comprises the magnetic tape.

13. The data storage device as recited in claim 11, wherein:
    the magnetic tape is housed in a cartridge assembly; and
    the data storage device comprises a tape drive assembly configured to receive the cartridge assembly.

14. The data storage device as recited in claim 11, wherein the second target tension is lower than the first target tension.

15. The data storage device as recited in claim 14, wherein the lateral offset of the first read element compensates for an expansion of the magnetic tape due to the lower tension while reading from the magnetic tape.

16. The data storage device as recited in claim 11, wherein the control circuitry is further configured to perform a read-after-write verification using the second read element.

17. The data storage device as recited in claim 16, wherein the head comprises a head bar comprising a second plurality of read elements substantially aligned with a plurality of corresponding write elements, and a first plurality of read elements each laterally offset from a corresponding one of the second plurality of read elements, wherein the second plurality of read elements are disposed between the plurality of corresponding write elements and the first plurality of read elements.

18. The data storage device as recited in claim 17, wherein the lateral offset between the first plurality of read elements and the second plurality of read elements increases toward an outer edge of the magnetic tape.

19. A data storage device configured to access a magnetic tape, the data storage device comprising:
    a head bar configured to access the magnetic tape, wherein the head bar comprises a first plurality of read elements and a second plurality of read elements each laterally offset from a corresponding one of the first plurality of read elements,
    wherein the lateral offset between the second plurality of read elements and the first plurality of read elements increases toward an outer edge of the magnetic tape.

20. The data storage device as recited in claim 19, further comprising control circuitry configured to:
    perform a read-after-write using the first plurality of read elements; and
    in response to a read command received from a host, perform a read using the second plurality of read elements.

21. The data storage device as recited in claim 19, further comprising control circuitry configured to:
   tension the magnetic tape based on a first target tension and write data to the magnetic tape; and
   tension the magnetic tape based on a second target tension and read from the magnetic tape using the second plurality of read elements.

22. A data storage device configured to access a magnetic tape, the data storage device comprising:
   at least one head configured to access the magnetic tape, wherein the head comprises a write element, a first read element substantially aligned with the write element, and a second read element laterally offset from the first read element, wherein the first read element is disposed between the write element and the second read element; and
   a means for writing to a data track and for performing a read-after-write verify using the write element and the first read element; and
   in response to a read command received from a host, a means for reading from the data track using the second read element.

23. The data storage device as recited in claim 22, wherein the head comprises a head bar comprising a plurality of first read elements substantially aligned with a plurality of corresponding write elements, and a plurality of second read elements each laterally offset from a corresponding one of the first read elements, wherein the first plurality of read elements are disposed between the plurality of corresponding write elements and the second plurality of read elements.

24. The data storage device as recited in claim 23, wherein the lateral offset between the second read element and the first read element increases toward an outer edge of the magnetic tape.

25. The data storage device as recited in claim 22, further comprising:
   a means for tensioning the magnetic tape based on a first target tension and writing data to the data track; and
   in response to the read command received from a host, a means for tensioning the magnetic tape based on a second target tension different from the first target tension and reading from the data track using the second read element.

26. The data storage device as recited in claim 23, wherein the head bar comprises a write element having a substantially aligned first read element without a corresponding laterally offset second read element.

* * * * *